United States Patent
Zhu

(10) Patent No.: US 8,320,108 B2
(45) Date of Patent: Nov. 27, 2012

(54) POWER SUPPLY

(75) Inventor: Hong-Ru Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 96 days.

(21) Appl. No.: 13/086,473

(22) Filed: Apr. 14, 2011

(65) Prior Publication Data

US 2012/0236486 A1 Sep. 20, 2012

(30) Foreign Application Priority Data

Mar. 17, 2011 (CN) .......................... 2011 1 0063993

(51) Int. Cl.
*B23K 11/24* (2006.01)
*H05K 5/00* (2006.01)
*H05K 7/00* (2006.01)

(52) U.S. Cl. ................... 361/679.01; 323/282; 323/283; 323/318; 323/322

(58) Field of Classification Search ............. 361/679.01, 361/679.02; 323/65, 222, 223, 226, 265, 323/268, 271, 273, 282, 283, 285, 318, 322

See application file for complete search history.

(56) References Cited

U.S. PATENT DOCUMENTS

| | | | | |
|---|---|---|---|---|
| 6,906,502 | B2* | 6/2005 | Kernahan et al. | 323/282 |
| 6,909,266 | B2* | 6/2005 | Kernahan et al. | 323/282 |
| 6,979,987 | B2* | 12/2005 | Kernahan et al. | 323/283 |
| 7,365,661 | B2* | 4/2008 | Thomas | 341/117 |
| 7,889,019 | B2* | 2/2011 | Gizara | 332/109 |
| 2005/0162144 | A1* | 7/2005 | Kernahan | 323/300 |
| 2008/0088385 | A1* | 4/2008 | Gizara | 332/109 |
| 2010/0238045 | A1* | 9/2010 | Feight et al. | 340/815.45 |
| 2011/0109322 | A1* | 5/2011 | Shi et al. | 324/555 |
| 2011/0285377 | A1* | 11/2011 | Chen et al. | 323/318 |
| 2012/0007571 | A1* | 1/2012 | Huisman | 323/271 |

* cited by examiner

*Primary Examiner* — Jinhee Lee
(74) *Attorney, Agent, or Firm* — Altis Law Group, Inc.

(57) ABSTRACT

A power supply includes a direct current (DC) voltage converter, a display, a voltage output interface, and a main controller. The DC voltage converter is connected to a voltage terminal of a peripheral interface. The display displays an input interface to allow a voltage value to be inputted therein. The main controller includes a voltage obtaining module and a control module. The voltage obtaining module is used to obtain the inputted voltage value, and output the inputted voltage value. The control module is used to output a pulse width modulation (PWM) signal to the DC voltage converter according to a proportion relationship between the inputted voltage value and the value of a predetermined voltage value. The DC voltage converter is used to convert the first voltage into a second voltage according to the PWM signal, and outputs the second voltage through the voltage output interface.

7 Claims, 3 Drawing Sheets

POWER SUPPLY

BACKGROUND

1. Technical Field

The present disclosure relates to a power supply.

2. Description of Related Art

In the field of electronic device function testing, when the electronic devices need to be tested, it is necessary to supply voltages to the tested electronic devices. However, most power supply only supply one voltage value at a time to the tested electronic devices. If other voltages need to be output by the power supply, the power supply need to be adjusted manually, which is inconvenient.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
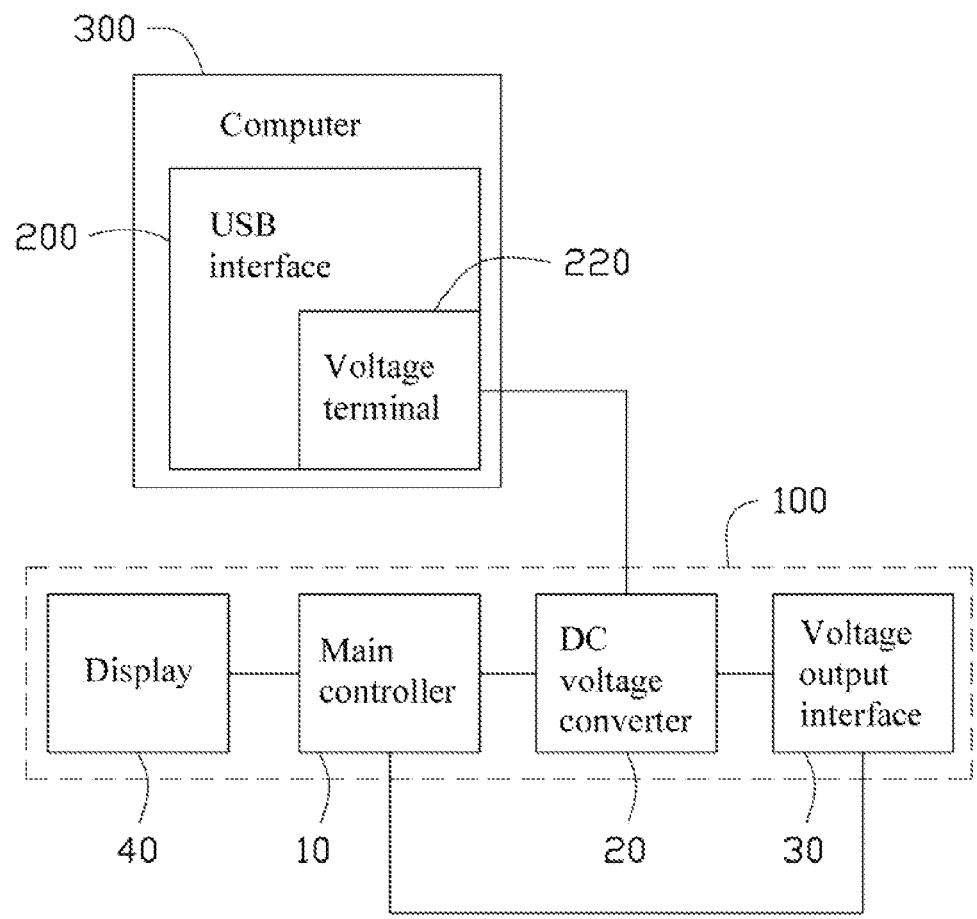
FIG. 1 is a block diagram of an exemplary embodiment of a power supply, the power supply includes a main controller and a display.

Referring to FIG. 1, an exemplary embodiment of a power supply 100 is connected to a peripheral interface such as a universal serial bus (USB) interface 200 of a computer 300. The power supply 100 includes a main controller 10, a direct current (DC) voltage converter 20, a voltage output interface 30, and a display 40. The main controller 10 is connected to the DC voltage converter 20, the voltage output interface 30, and the display 40. A voltage terminal 220 of the USB interface 200 is connected to a 5 volt (V) system voltage terminal of a motherboard of the computer to receive a 5V first voltage. The DC voltage converter 20 is connected to the voltage terminal 220 of the USB interface 200 to receive the five voltage from the voltage terminal 220 of the USB interface 200. The DC voltage converter 20 is also connected to the voltage output interface 30.

Figure 2:
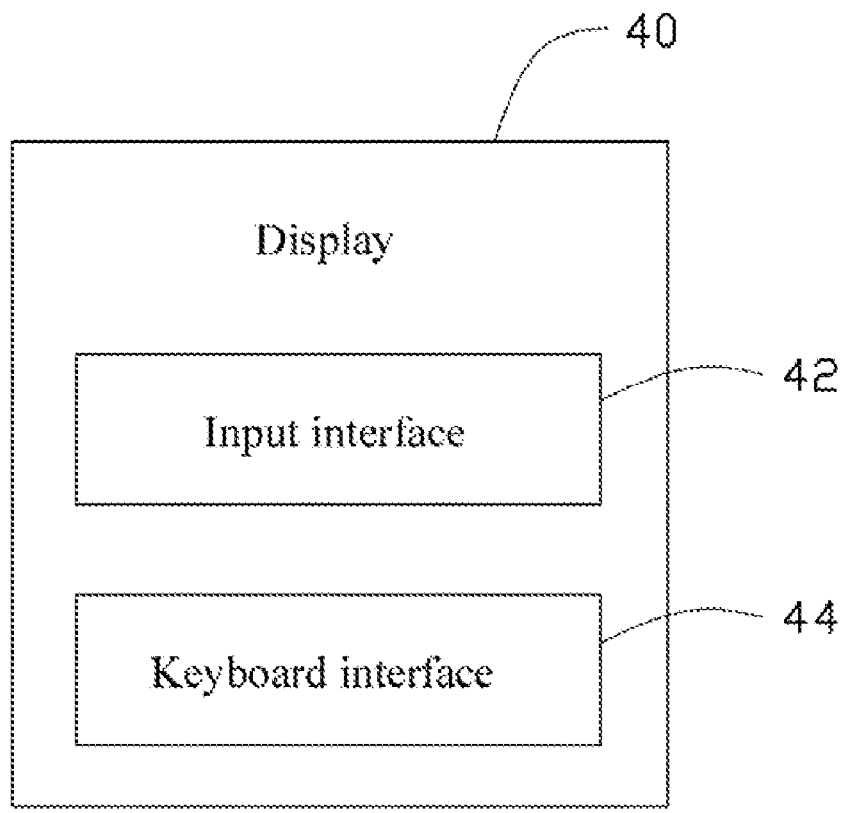
FIG. 2 is a block diagram of the display of FIG. 1.

Referring to FIG. 2, the display 40 is used to display an input interface 42 and a keyboard interface 44 to make the users apply the keyboard interface 44 to input a voltage value needed by users in the input interface 42.

Figure 3:
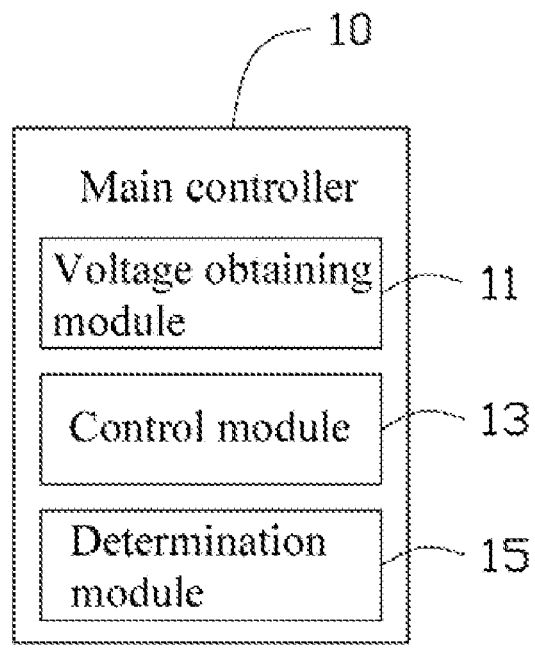
FIG. 3 is a block diagram of the main controller of FIG. 1.

Referring to FIG. 3, the main controller 10 includes a voltage obtaining module 11, a control module 13, and a determination module 15.

The voltage obtaining module 11 is used to obtain the input voltage value by the users, and output the input voltage value to the control module 13.

The control module 13 stores a predetermined voltage value which is equal to 5V. The control module 13 is used to receive the input voltage value, and output a pulse width modulation (PWM) signal to the DC voltage converter 20 according to a proportion relationship between the predetermined voltage value and the input voltage value.

The DC voltage converter 20 is used to convert the first voltage into a second voltage according to the PWM signal, and output the second voltage to the determination module 19.

The determination module 15 is used to determine whether a value of the second voltage is equal to the input voltage value. If the value of the second voltage is equal to the input voltage value, the determination module outputs a control signal to the control module 13. The control module 13 controls the DC voltage converter 20 to output the second voltage to the voltage output interface 30, and controls the display 40 to display the value of the second voltage. If the value of the second voltage value is not equal to the input voltage value, that is the value of the second value is greater or less than the input voltage value, the determination module transmits a first or second instruction to the control module 13.

The control module 13 is used to adjust a duty cycle of the PWM signal according to the first or second instruction, and output the adjusted PWM signal to the DC voltage converter 20, to make the value of the second voltage to the input voltage value. That is, the control module 13 increases a duty cycle of the PWM signal according to the first instruction, and decreases the duty cycle of the PWM signal according to the second instruction.

In other embodiments, when the value of the second voltage converted by the DC voltage converter 20 is equal to the input voltage value, the determination module 15 can be omitted. The DC voltage converter 20 outputs the second voltage through the voltage output interface 30 directly, and controls the display 40 to display the value of the second voltage.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply connected to a peripheral interface of a computer, the power supply comprising:
    a direct current (DC) voltage converter connected to a voltage terminal of the peripheral interface to receive a first voltage of the peripheral interface;
    a display to display an input interface to allow a voltage value to be inputted in the input interface;
    a voltage output interface connected to the DC voltage converter; and
    a main controller connected to the DC voltage converter, the voltage output interface, and the display, the main controller comprising:
        a voltage obtaining module to obtain the inputted voltage value, and output the inputted voltage value; and
        a control module to receive the inputted voltage value, and output a pulse width modulation (PWM) signal to the DC voltage converter according to a proportion relationship between the inputted voltage value and a predetermined voltage value stored in the control module;
    wherein the DC voltage converter converts the first voltage into a second voltage according to the PWM signal, and outputs the second voltage through the voltage output interface.

2. The power supply of claim 1, wherein the display is further used to display a keyboard interface to input the inputted voltage value in the input interface.

3. The power supply of claim 1, wherein the peripheral interface is a universal serial bus interface.

4. A power supply connected to a peripheral interface of a computer, the power supply comprising:
- a direct current (DC) voltage converter connected to a voltage terminal of the peripheral interface to receive a first voltage of the peripheral interface;
- a display to display an input interface to allow a voltage value to be inputted in the input interface;
- a voltage output interface connected to the DC voltage converter; and
- a main controller connected to the DC voltage converter, the voltage output interface, and the display, the main controller comprising:
  - a voltage obtaining module to obtain the inputted voltage value, and output the inputted voltage value;
  - a control module to receive the inputted voltage value, and output a pulse width modulation (PWM) signal to the DC voltage converter according to a proportion relationship between the inputted voltage value and a predetermined voltage value stored in the control module, wherein the DC voltage converter converts the first voltage into a second voltage according to the PWM signal; and
  - a determination module to determine whether the value of the second voltage is equal to the inputted voltage value, wherein if the value of the second voltage is equal to the inputted voltage value, the determination module outputs a control signal to the control module, wherein the control module controls the DC voltage converter to output the second voltage through the voltage output interface, and controls the display to display the value of the second voltage; if the value of the second voltage value is not equal to the inputted voltage value, the determination module transmits an instruction to the control module; wherein the control module adjusts a duty cycle of the PWM signal according to the instruction, and outputs the adjusted PWM signal to the DC voltage converter to make the value of the second voltage equal to the input voltage value.

5. The power supply of claim 4, wherein if the value of the second voltage is greater than the inputted voltage value, the control module increases the duty cycle of the PWM signal, and outputs the PWM signal to the DC voltage converter to increase the second voltage; if the value of the second voltage is less than the inputted voltage value, the control module decreases the duty cycle of the PWM signal, and outputs the PWM signal to the DC voltage converter to decrease the second voltage.

6. The power supply of claim 4, wherein the display is further used to display a keyboard interface to input the inputted voltage value in the input interface.

7. The power supply of claim 4, wherein the peripheral interface is a universal serial bus interface.

* * * * *